United States Patent
Munn

(10) Patent No.: US 7,787,739 B2
(45) Date of Patent: Aug. 31, 2010

(54) BARE FIBER ADAPTER

(75) Inventor: Matthew A. Munn, Gardner, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 154 days.

(21) Appl. No.: 11/904,556

(22) Filed: Sep. 27, 2007

(65) Prior Publication Data

US 2009/0060418 A1    Mar. 5, 2009

Related U.S. Application Data

(60) Provisional application No. 60/966,448, filed on Aug. 28, 2007.

(51) Int. Cl.
*G02B 6/00* (2006.01)
*G01N 21/00* (2006.01)

(52) U.S. Cl. .................. 385/137; 385/53; 385/81; 385/83; 385/88; 385/136; 356/73.1

(58) Field of Classification Search ......... 385/136–137, 385/53, 81, 83, 88; 356/73.1
See application file for complete search history.

(56) References Cited

U.S. PATENT DOCUMENTS

| | | | |
|---|---|---|---|
| 1,560,308 A | 11/1925 | Perry | |
| 2,086,152 A | 7/1937 | Bedell | |
| 2,247,041 A | 6/1941 | Bergan | |
| 3,143,595 A | 8/1964 | Martin | |
| 3,173,991 A | 3/1965 | Breakfield, Sr. | |
| 3,683,167 A * | 8/1972 | Rishton | 362/581 |
| 3,864,008 A | 2/1975 | Bakermans et al. | |
| 4,394,533 A | 7/1983 | Naito | |
| 4,672,198 A * | 6/1987 | Presby | 356/73.1 |
| 4,834,682 A | 5/1989 | Auclair et al. | |
| 4,973,370 A | 11/1990 | Kreinberg | |
| 5,030,797 A | 7/1991 | Logstrup | |
| 5,574,813 A * | 11/1996 | Chudoba et al. | 385/81 |
| 5,605,474 A | 2/1997 | Auclair | |
| 5,612,780 A * | 3/1997 | Rickenbach et al. | 356/73.1 |
| 5,664,957 A | 9/1997 | Starr | |
| 5,757,997 A * | 5/1998 | Birrell et al. | 385/60 |
| 5,761,360 A * | 6/1998 | Grois et al. | 385/81 |
| D400,169 S | 10/1998 | Endo | |
| 5,818,993 A * | 10/1998 | Chudoba et al. | 385/81 |
| 6,064,791 A * | 5/2000 | Crawford et al. | 385/134 |

(Continued)

OTHER PUBLICATIONS

Restriction Requirement date mailed Dec. 18, 2008 in U.S. Appl. No. 12/123,011.

(Continued)

*Primary Examiner*—Brian M. Healy
*Assistant Examiner*—Guy G Anderson
(74) *Attorney, Agent, or Firm*—Sonnenschein Nath & Rosenthal LLP

(57) ABSTRACT

A system and method for testing a bare fiber optic. An actuator disposed on an adapter is engaged. The bare fiber optic is received in an insertion hole of the adapter for ensuring contact between the bare fiber optic and a test adapter in response to the actuator being engaged. The actuator is released in order to secure the bare fiber optic for testing. The bare fiber optic is tested through the test adapter in contact with the adapter.

20 Claims, 7 Drawing Sheets

U.S. PATENT DOCUMENTS

| | | | |
|---|---|---|---|
| 6,230,406 B1 | 5/2001 | Balfour et al. | |
| 6,373,562 B1 * | 4/2002 | Marsh et al. | 356/73.1 |
| 6,688,777 B1 * | 2/2004 | Ostrander et al. | 385/70 |
| 6,741,786 B2 * | 5/2004 | Flower et al. | 385/137 |
| 6,821,025 B2 * | 11/2004 | Gerhard | 385/85 |
| 6,973,252 B2 * | 12/2005 | Doss et al. | 385/137 |
| 7,591,696 B1 | 9/2009 | Munn et al. | |
| 2009/0103870 A1 * | 4/2009 | Solomon et al. | 385/98 |

OTHER PUBLICATIONS

Response filed Jan. 9, 2009 to Restriction Requirement dated Dec. 18, 2008 in U.S. Appl. No. 12/123,011.

Non-Final Rejection date mailed Feb. 18, 2009 in U.S. Appl. No. 12/123,011.

Examiner Interview Summary date mailed Mar. 13, 2009 in U.S. Appl. No. 12/123,011.

Response filed Mar. 16, 2009 to Non-Final Rejection dated Feb. 18, 2009 in U.S. Appl. No. 12/123,011.

Notice of Allowance date mailed May 29, 2009 in U.S. Appl. No. 12/123,011.

Notice of Drawing Inconsistency with Specification date mailed Jun. 18, 2009 in U.S. Appl. No. 12/123,011.

312 Amendment filed Jul. 8, 2009 in U.S. Appl. No. 12/123,011.

Response to Amendment Under Rule 312 date mailed Jul. 9, 2009 in U.S. Appl. No. 12/123,011.

"Grounding/Bonding Straps"; Emerson™ Network Power Energy Systems, North America, 2007 (2 pages).

"Microbond", Electric Motion Company, Inc. (Copyright 2006-2010); retrieved from the Internet on Feb. 23, 2010 at URL: <http://www.electricmotioncompany.com/emc.php?type=bonding&sub-Microbond> (Original Internet Publication Date Unknown) (7 pages).

* cited by examiner

BARE FIBER ADAPTER

CROSS-REFERENCE TO RELATED APPLICATIONS

This Application claims priority to Provisional Patent Application 60/966,448 filed on Aug. 28, 2007, the entire teachings of which are incorporated herein by reference.

STATEMENT REGARDING FEDERALLY SPONSORED RESEARCH OR DEVELOPMENT

Not applicable

BACKGROUND

The use and development of communications networks has grown nearly exponentially in recent years. The growth in communication usage is fostered by better transmission technology, larger networks, advanced devices, increased processing power, and enhanced protocols. In particular, millions and millions of miles of fiber optic cable are installed, serviced, and maintained each year. Frequently, the integrity of a fiber optic line or segment needs to be tested at multiple times before, during, and after installation.

In order to effectively test fiber, a fusion splice, mechanical splice, or adapter needs to be used. Existing splice solutions and bare fiber adapters are very expensive. Additionally, these test solutions are not user friendly and may require extensive technical training. As a result, businesses and individuals may spend extensive time, effort, and money to properly connect to and test a fiber optic line. The existing bare fiber adapters may also require a test stand or semi-clean environment which may be hard to set up or find in the "field" where most bare fiber testing needs to occur.

SUMMARY

One embodiment includes a system and method for testing a bare fiber optic. An actuator disposed on an adapter is engaged. The bare fiber optic is received in an insertion hole of the adapter for ensuring contact between the bare fiber optic and a test adapter in response to the actuator being engaged. The actuator is released in order to secure the bare fiber optic for testing. The bare fiber optic is tested through the test adapter in contact with the adapter.

Another embodiment includes a bare fiber adapter. The bare fiber adapter may include a port for receiving a test adapter. The bare fiber adapter may also include an insertion hole for receiving a bare fiber optic into a fiber channel. The bare fiber adapter may further include an actuator configured to release a fiber clamp, wherein as the actuator is engaged may allow the bare fiber optic to be inserted or removed from the insertion hole, and wherein when the actuator is disengaged the bare fiber optic may secure the bare fiber optic for testing.

Another embodiment includes a bare fiber adapter. The bare fiber adapter may include a test port for receiving a hybrid test adapter configured to interface with a test set. The bare fiber adapter may also include an insertion hole configured to receive a bare fiber optic into a fiber channel that guides the bare fiber to an interface of the hybrid test adapter. The bare fiber adapter may further include a locking button linked to a spring-loaded bare fiber optic clamp that when pressed allows the bare fiber optic to be released or inserted into the insertion hole, wherein as the locking button is released, the spring-loaded bare fiber optic clamp secures the bare fiber optic for testing. The bare fiber adapter may further include a magnetic fastener for magnetically securing the bare fiber adapter during testing.

BRIEF DESCRIPTION OF THE DRAWINGS

Illustrative embodiments of the present invention are described in detail below with reference to the attached drawing figures which are incorporated by reference herein and wherein.

DETAILED DESCRIPTION OF THE DRAWINGS

Figure 1:
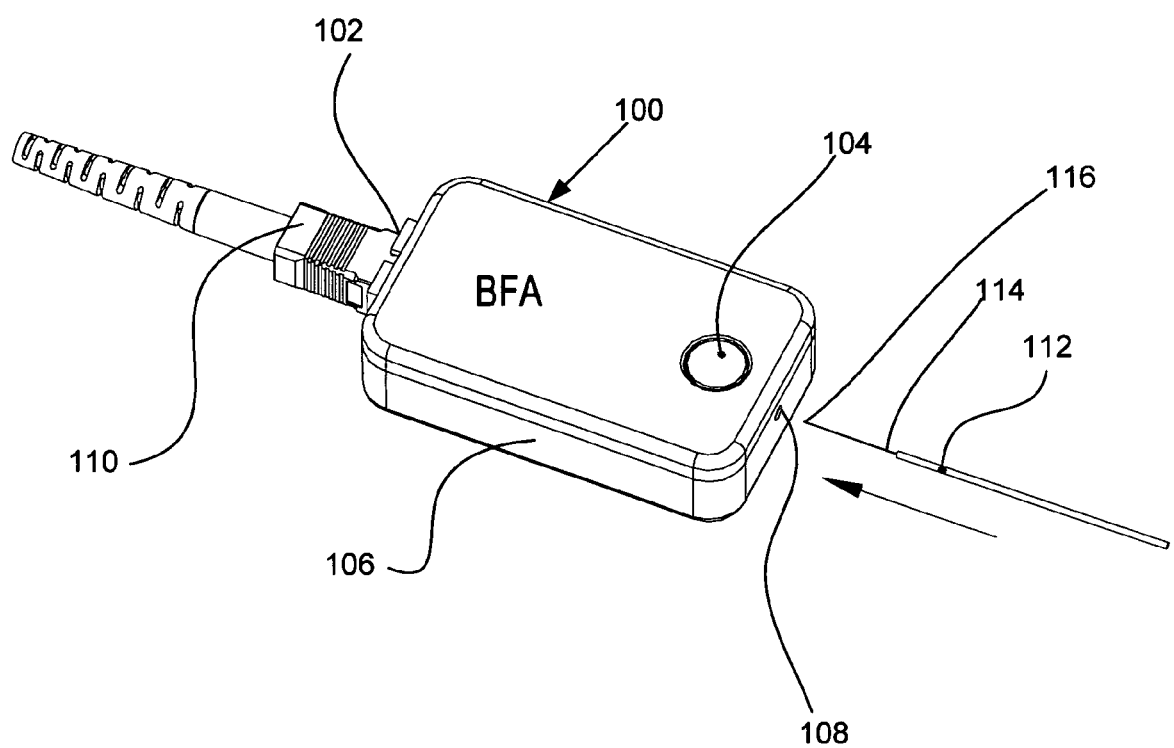
FIG. 1 is a perspective diagram of a bare fiber adapter in accordance with an illustrative embodiment.

FIG. 1 is a perspective diagram of a bare fiber adapter in accordance with an illustrative embodiment. FIG. 1 illustrates one example of a bare fiber adapter 100. The bare fiber adapter 100 may include a number of parts or components including a test port 102, a locking button 104, a case 106, and an insertion hole 108. For illustration purposes, a test adapter 110, a fiber optic 112, a bare fiber 114, and an endface 116 are also illustrated. The bare fiber adapter 100 is a device for aligning the endface 116 of the bare fiber 114 with another fiber optic or communications medium. The bare fiber adapter 100 is particularly suited for testing properties of one or more fibers or communications through the one or more fibers.

The bare fiber adapter 100 may be suited to test the fiber optic 112. The fiber optic 112 may be a single strand of fiber optic cable that is used for communications. In another example, the fiber optic 112 may be a single strand of a cable or fiber bundle including multiple fibers. The fiber optic 112 may be buried, surface mounted, aerially mounted, or otherwise strung or distributed between multiple points. The bare fiber 114 maybe glass, plastic, or a combination thereof suitable to guide light along its length by confining or using total internal reflection to keep as much light as possible in a propagating form. The fiber optic 112 may include single or multi-mode fibers with diameters including, but not limited to, 0.9 millimeter and 0.25 millimeter diameters.

The bare fiber adapter 100 may be used to test the fiber optic 112 straight off a reel during installation, once installed, during troubleshooting, or at any other time that a test of the fiber optic 112 becomes useful or necessary. The bare fiber adapter 100 provides a simple and cost effective way of testing the fiber optic 112 to measure propagation characteristics and other factors that may affect communication or the other designated uses of the fiber optic 112.

The fiber optic 112 illustrates a complete fiber including waveguide core, shielding, cladding, buffer, installation armor, or a jacket. The different portions of the fiber optic 112 may maximize refraction within the bare fiber 114 and protect and shield the bare fiber 114 during installation and from moisture or other environmental factors.

Before the fiber optic 112 may be tested, a user may be required to remove the protective materials in order to expose the bare fiber 114 for testing. In one embodiment, the bare fiber adapter 100 may include a stripping tool for removing the protective materials to expose the bare fiber 114.

The bare fiber adapter 100 maybe suited to test the bare fiber 114 using terminal equipment. The terminal or test equipment may include optical loss test cables, adapters, test sets, power meters, length testers, talk sets, fiber tracers, visual fault locators, optical time domain reflectometers (OTDR), or other equipment suitable for testing the fiber optic 112. In one embodiment, the bare fiber adapter 100 includes the test port 102. The test port 102 is a receptacle for receiving the test adapter or other fiber optic test equipment. The test port 102 may be configured to connect any number of optical fiber connectors to the bare fiber adapter 100. In particular, the test port 102 may allow a test adapter 110 to send or receive a test signal through the fiber optic 112 by aligning the bare fiber 114 with a fiber of the test adapter 110. For example, the standard fiber connectors that may interface with the bare fiber adapter 100 through the test port 102 may include standard connectors, such as face contact (FC), subscriber connector (SC), SMA, FDDI, Mini-BNC, Biconic, ST, LC or MT-RJ. For purposes of illustration, the test adapter 110 may be referred to as an SC adapter or SC connector based on the number of practical applications using SC adapters.

In one embodiment, the test adapter 110 is a jumper or other cable interface suitable to communicate a fiber optic signal to other terminal or testing equipment. For example, the test adapter 110 is a length of fiber optic that interfaces with the bare fiber 114 to be tested using an OTDR or other similar optical testing equipment. The bare fiber 114 includes the endface 116. The endface 116 is the portion of the bare fiber 114 that is aligned with a ferrule or fiber of the test adapter 110 within the bare fiber adapter 100 to fully test the characteristics, performance, and integrity of the fiber optic 112. The endface 116 maybe precisely cleaved in order to insure that the bare fiber 114 has a perpendicular edge for facilitating alignment with the test adapter 110 in order to minimize refraction loss or other factors affecting light transmission from the fiber optic 112 through the test adapter 110. In one embodiment, the endface 116 maybe further aligned and held together with the test adapter 110 using a matching gel alcohol or other indexed matching material that enhances the transmission of light across the joint between the endface 116 and the ferrule of the test adapter 110 within the bare fiber adapter 100.

The case 106 may be a frame of the bare fiber adapter 100 that allows the bare fiber 114 to interact with the test adapter 110 without interference from environmental factors such as dust, smoke, light, or wind. The case 106 may be plastic, metal, or a composite material. In one embodiment, the case 106 may be changeable or adaptable based on the intended purpose or use of the bare fiber adapter 100. For example, in situations where the bare fiber adapter 100 may be stepped on, the case may be metal to prevent the internal components from being scratched.

The bare fiber adapter 100 may also include an actuator for engaging a fiber clamp. The actuator is a release for engaging and disengaging the fiber clamp. One example of the actuator is the locking button 104 which may be pressed in order to allow the bare fiber 114 to be inserted into the insertion hole 108. In one embodiment, the insertion hole 108 is the hole or receptacle for receiving the bare fiber 114. In another embodiment, the insertion hole 108 maybe sized to receive a portion of the fiber optic that has not been removed from the bare fiber 114. In particular, the locking button 104 may control a spring-loaded fiber clamp within the bare fiber adapter 100. When pressed, the locking button 104 may release the spring-loaded fiber clamp so that the bare fiber 114 may be inserted into a channel of the bare fiber adapter 100 in order to interact with the test adapter 110.

Once a specified portion of the bare fiber 114 is inserted through the insertion hole 108, the user may release the locking button 104, thereby allowing the spring-loaded fiber clamp to secure or cushion the bare fiber 114 during testing. As a result, once the bare fiber 114 is inserted into the bare fiber adapter 100 and the locking button 104 is released, the bare fiber 114 is securely held for testing to provide an effective temporary or permanent mechanical splice or interconnection between the ferrule of the test adapter 110 and the bare fiber 114. In another embodiment, the user may simply insert the bare fiber 114 into the insertion hole 108 until the endface 116 makes contact with a test fiber of the test adapter 110 within the ferrule of the test adapter 110.

Figure 2:
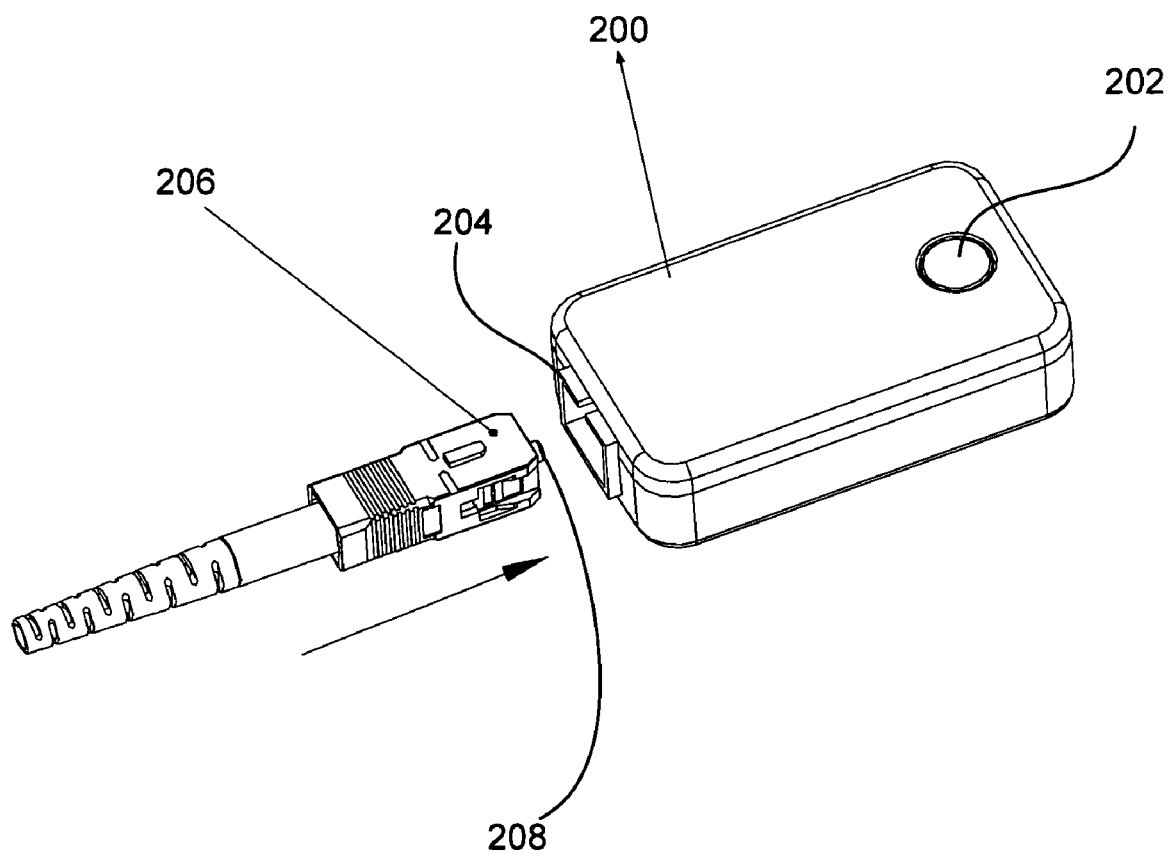
FIG. 2 is a perspective diagram of a bare fiber adapter and SC connector in accordance with an illustrative embodiment.

FIG. 2 is a perspective diagram of a bare fiber adapter and test connector in accordance with an illustrative embodiment. FIG. 2 presents another view of a bare fiber adapter 200. As previously described, the bare fiber adapter 200 includes a locking button 202 and a test port 204. FIG. 2 also includes a test connector 206 and a ferrule 208. The test connector 206 is a particular implementation of the test adapter 110 of FIG. 1.

The test connector 206 incorporates a fiber optic or other light guide herein referred to as a test fiber for transmission of communications information, data, or light to test equipment for analysis. The ferrule 208 is an endpoint of the fiber optic embedded within the test connector 206 that interfaces with the bare fiber of the fiber optic being tested. The ferrule 208 may be a tube, sleeve, clamp, or housing within the test connector 206 that aligns a test fiber of the test connector 206 with the bare fiber. As shown, the bare fiber adapter 200 includes the test port 204 for enabling the test connector 206 to be easily inserted within the bare fiber adapter 200 for testing of the fiber optic.

The test port 204 may be configured as a hybrid port in order to allow any number or type of test connectors to connect to or be inserted into the bare fiber adapter 200. In one embodiment, the test port 204 may secure the test connector 206 once inserted so that the test connector 206 cannot be accidentally removed or dislodged during testing. For example, the test port 204 or the test connector 206 may include a clip for inserting and/or releasing the test connector 206 once mated with the test port 204. In another embodiment, the bare fiber adapter 200 may include a secondary locking button for allowing the insertion and/or release of the test connector 206 from the test port 204. The test connector 206 may be only a portion of a hybrid test jumper or connector that is tied directly to test equipment or that may be mated to test equipment for testing, analysis, and troubleshooting.

Figure 3:
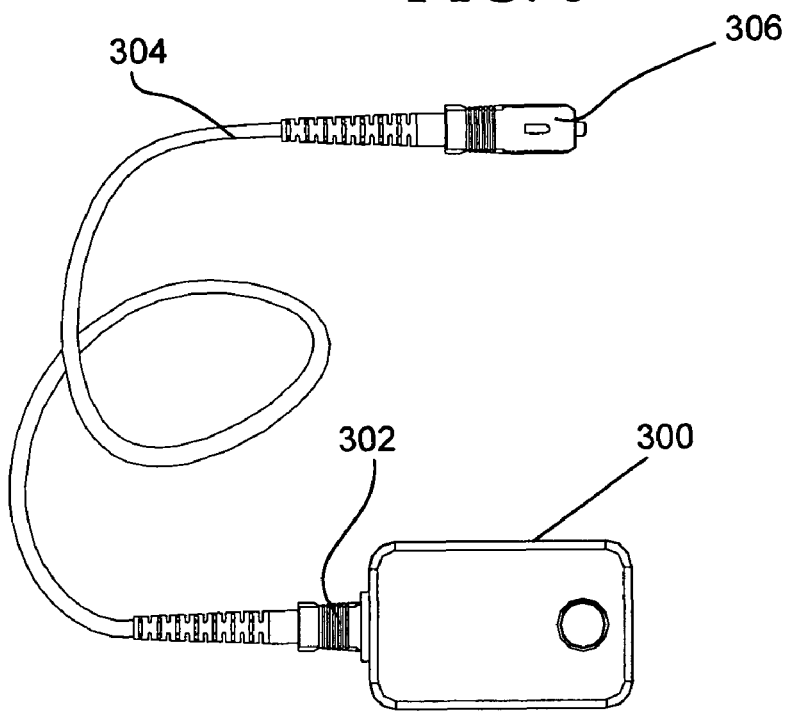
FIG. 3 is a top view of a bare fiber adapter in accordance with an illustrative embodiment.

FIG. 3 is a top view of a bare fiber adapter in accordance with an illustrative embodiment. FIG. 3 further illustrates a configuration of a bare fiber adapter 300. In particular, FIG. 3 illustrates a test adapter 302, a test jumper 304, and a test connector 306.

As shown, the test adapter 302 may be inserted into the test port of the bare fiber adapter 300. The test jumper 304 may be of any length and may be connected to other testing equipment, communications equipment, or other ports as necessary for testing the fiber optic. The test connector 306 may be inserted into an OTDR or other test equipment for testing the fiber optic. In some cases, multiple bare fiber adapters may be used to test from both ends of a fiber optic roll or line at once. The test connector 306 may be a hybrid connector for interfacing with multiple forms of testing equipment.

Figure 4:
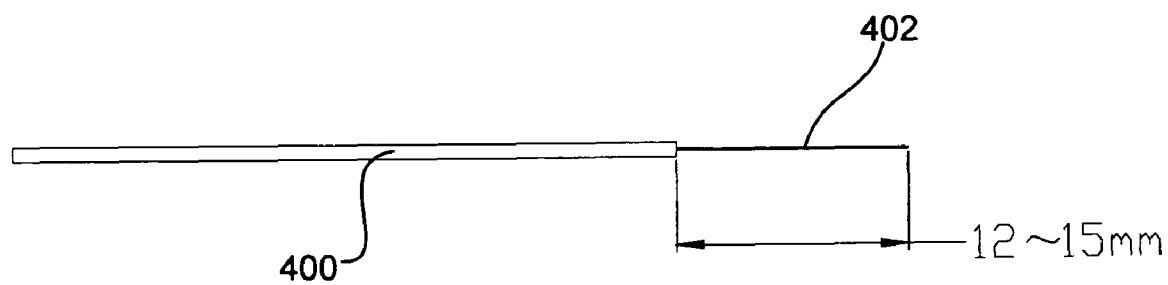
FIG. 4 is a perspective diagram of a fiber optic line in accordance with an illustrative embodiment.

FIG. 4 is a perspective diagram of a fiber optic line in accordance with an illustrative embodiment. FIG. 4 illustrates a fiber optic 400 and a corresponding bare fiber 402. As previously described, the fiber optic 400 may be a single strand within a multi-strand bundle or cable. The fiber optic 400 may be individually shielded, clad, insulated, covered, or otherwise protected. Alternatively, a number of bare fibers may be protected by a single surrounding cover shield cladding or buffer.

The fiber optic 400 may be single or multi-mode fiber depending on the type of application. In one example, the fiber optic 400 may be a 0.25 millimeter or 0.9 millimeter fiber that is tested. In some cases, the bare fiber adapter may have a minimum amount of bare fiber 402 that must be exposed in order to effectively test the fiber optic 400. In one example, a portion of 12 millimeters or more must be exposed in order to effectively test the fiber optic 400. If insufficient bare fiber 402 is exposed, the bare fiber 402 may be unable to abut or connect with the ferrule of the test adapter within the bare fiber adapter, thereby preventing the fiber optic 400 from being tested, diagnosed, or otherwise evaluated.

Figure 5:
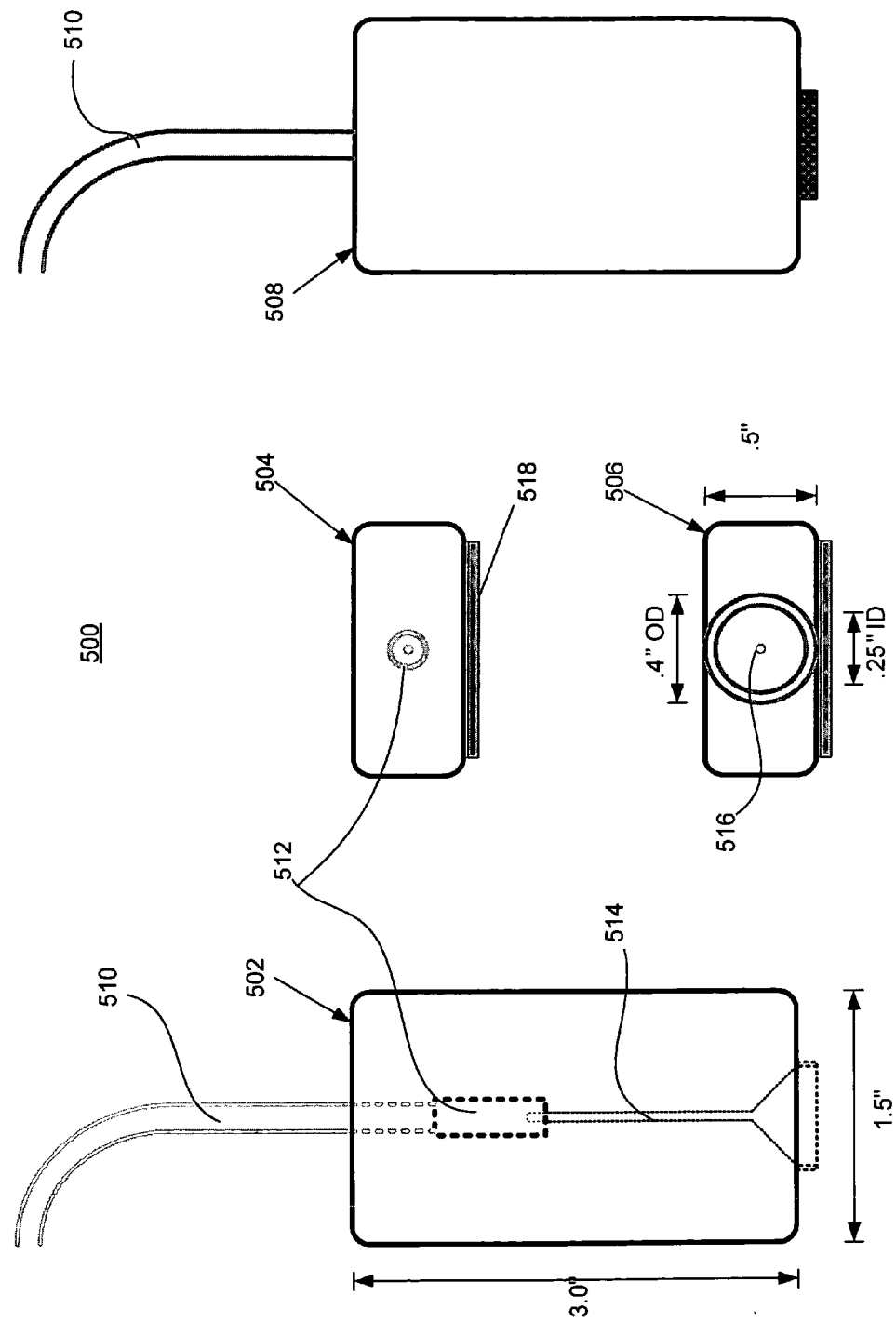
FIGS. 5 is a hidden-line top view and perspective views of a bare fiber adapter in accordance with an illustrative embodiment.

FIG. 5 is a hidden-line top view and perspective views of a bare fiber adapter in accordance with an illustrative embodiment. FIG. 5 illustrates a few different views of a bare fiber adapter 500. In particular, the FIG. 5 illustrates a top cut-away view 502, side views 504 and 506, and a top view 508. FIG. 5 further illustrates a test adapter 510, a test port 512, a fiber channel 514, an insertion hole 516, and a magnetic fastener 518.

As shown by the top cut-away view 502 and the side view 504, the test adapter 510 may be inserted into the test port 512. In another embodiment, the test adapter 510 may be an integrated portion of the bare fiber adapter 500. For example, the test adapter 510 may be permanently attached to the bare fiber adapter 500 for connecting to optical test equipment. As previously described, the test adapter 510 may connect to the test port 512 by snapping into place or otherwise being secured.

The fiber channel 514 guides the bare fiber as it is inserted so that endfaces of the ferrule of the test adapter 510 and the endface of the bare fiber may properly intersect or abut for enabling a connection with minimal loss and reflection. The bare fiber is inserted into the bare fiber adapter 500 through the insertion hole 516. Numerous types and configurations of the bare fiber adapter 500 may be used, produced, or generated for the different diameters of bare fiber currently used. For example, in some cases the insertion hole 516 may be specifically configured for 0.9 millimeter fibers. As a result, a user may be required to access a different bare fiber adapter 500 in order to properly test 0.25 millimeter fiber optics. In one embodiment, the insertion hole 516 may be funnel shaped. In other words, the insertion point into the bare fiber adapter 500 may be wider and narrow as the bare fiber is inserted into the fiber channel 514 for ease of use.

In another embodiment, the cover of the bare fiber adapter 500 maybe removed to extract a bare fiber if it breaks off within the insertion hole 516 and fiber channel 514. Alternatively, the bare fiber adapter 500 may include a fiber tray that allows the fiber channel 514 to be extracted altogether or partially removed in order to manually or automatically remove a broken portion of the bare fiber. The fiber tray may be environmentally sealed to prevent dust or other contaminants from entering the fiber channel 514 except when opened to clear the fiber channel 514. In yet another embodiment, the bare fiber adapter 500 may include an air or water port connected to the fiber channel 514 for removing a broken piece of fiber. For example, an air compressor nozzle or rinse tube may be inserted into the air or water port to remove the broken fiber and return the bare fiber adapter 500 back to a usable condition. The fiber channel 514 may include a lever that may be activated by a user from the outside of the bare fiber adapter 500 for forcibly removing the broken fiber.

The magnetic fastener 518 is a magnetic element integrated or attached to the bare fiber adapter 500. The magnetic fastener 518 may be configured to allow the bare fiber adapter 500 to be secured to a metallic surface during testing. For example, the user may insert the bare fiber into the bare fiber adapter 500 and secure the bare fiber using the spring-loaded fiber clamp. Once the bare fiber adapter 500 is connected to a fiber and/or test equipment, the magnetic fastener 518 may be configured to secure the bare fiber adapter 500 to a test stand, vehicle, pipe, or other available surface in order to insure that the bare fiber adapter 500 does not move or is not bumped during testing. As a result, the user may not be required to hold the bare fiber adapter 500 or the bare fiber during testing based on the securing features available through the spring-loaded fiber clamp and the magnetic fastener 518.

The magnetic fastener 518 may be part of the bottom, sides, or top of the bare fiber adapter 500. In one embodiment, the magnetic fastener 518 may be configured to attach to a selected portion of the bare fiber adapter 500 based on the needs of the user or technician. For example, by using a clip or slide attachment, the magnetic fastener 518 may be configured for specified circumstances and testing needs. Alternatively, the entire case of the bare fiber adapter 500 may form the magnetic fastener.

Figure 6:
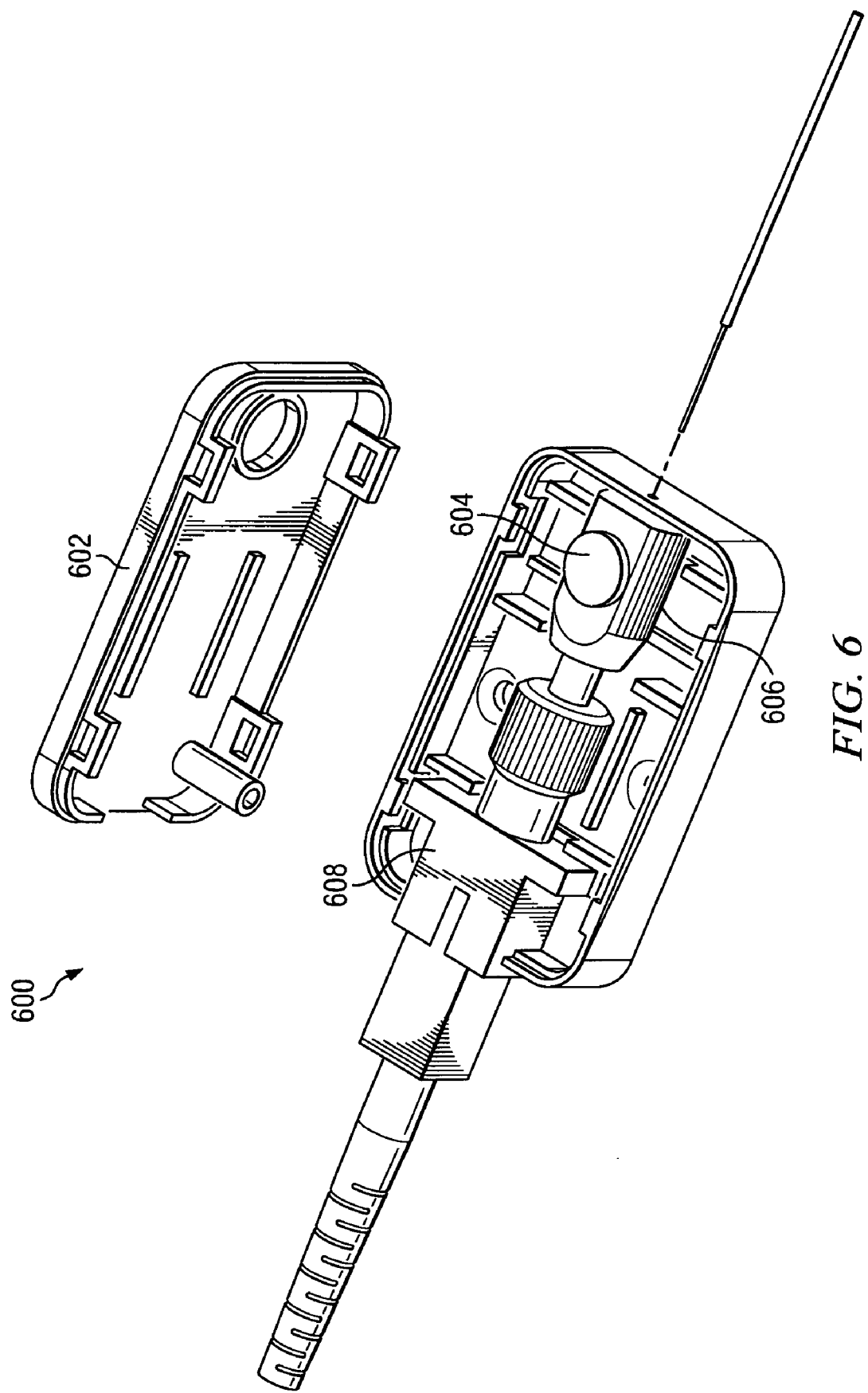
FIG. 6 is a cut-away view of a bare fiber adapter in accordance with an illustrative embodiment.

FIG. 6 is a view of a bare fiber adapter in accordance with an illustrative embodiment. The bare fiber adapter 600 of FIG. 6 is shown as cut-away or with a cover 602 removed. The bare fiber adapter 600 further illustrates the locking button 604, spring-loaded clamp 606, and test port 608.

Figure 7:
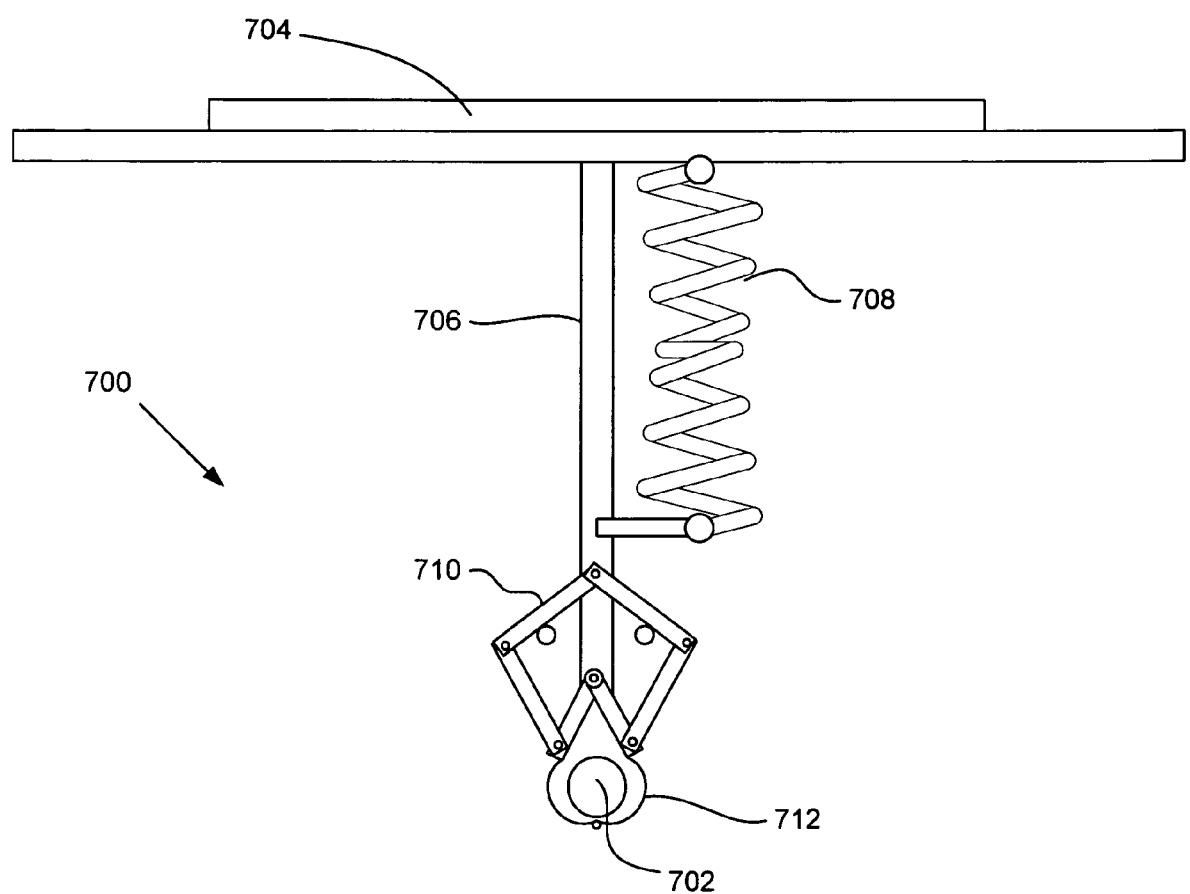
FIG. 7 is a view of selected portions of the fiber clamp in accordance with an illustrative embodiment.

As previously described, the spring-loaded clamp 606 maybe activated by the locking button 604. In one embodiment, the locking button 604 may be pressed in order to allow the bare fiber to be inserted into the bare fiber adapter 600 and released to secure the bare fiber for testing. In another embodiment, the locking button 604 may be pressed or activated to lock or secure the spring-loaded clamp 606 for testing of the bare fiber. The spring-loaded clamp 606 may be configured in any number of ways; FIG. 7 illustrates one example.

The test port 608 allows the test connection to be fully inserted into the bare fiber adapter 600. The test connection may lock into the test port 608 or may be otherwise secured. The cover 602 may be removed in order to clean, rinse, or use air to clean the bare fiber adapter 600. In one embodiment, the bare fiber adapter 600 may include cleaning ports or specifically placed holes for allowing the ferrule and test fiber of the test adapter to be cleaned. For example, when the bare fiber adapter 600 has been used once, a user may remove the cover 602 and use an air compressor or canned air to blow off any dried matching gel within the test port 608, making it read for the next time the bare fiber adapter 600 is used.

FIG. 7 is a view of selected portions of the fiber clamp in accordance with an illustrative embodiment. A fiber clamp 700 may be configured in many different ways. The fiber clamp 700 is one example, but any number of compression, elastomeric, or spring-loaded mechanisms may be used to secure a bare fiber 702. The fiber clamp 700 is a particular implementation of the fiber clamp 606 of FIG. 6. The fiber clamp 700 may include a locking button 704, tension bar 706, spring 708, linkage 710, and securing arms 712.

The locking button 704 is a particular implementation of the actuator and corresponding locking button 104 of FIG. 1. However, the locking button 704 maybe a knob, lever, dial, slider, or any other mechanism suitable for being engaged, activated, pressed, or receiving pressure from a user. The locking button 704 may extrude from the top of the bare fiber adapter or it may be otherwise activated.

In one embodiment, the spring 708 may be a tension spring. In other words, the spring 708 becomes longer under a load and returns to a short length once the load is released. The spring 708 may be replaced by any number of bands, elastomers, springs, hydraulics, or other tension or compression mechanisms. Once the locking button 704 is pressed, the tension bar 706 moves toward the bare fiber 702. The spring 708 is stretched and the linkage 710 causes the securing arms 712 to open. As a result, as the locking button 704 is pressed, the securing arms 712 are opened for inserting the bare fiber 702.

The securing arms 712 may be cushioned or padded for securing the bare fiber 702. The securing arms 712 may be integrated with the fiber channel 514 of FIG. 5. In particular, the securing arms 712 may ensure that the bare fiber 702 does not move once the locking button 704 is released. As a result, the user may be able to handle other elements and not worry about the bare fiber 702 being damaged or becoming unsecured within the bare fiber adapter.

The securing arms 712 may hold the entire portion of the bare fiber 702 as it is inserted into the bare fiber adapter or may hold only a portion of the bare fiber 702 inserted through the insertion hole. The securing arms 712 may be configured to secure the bare fiber 702 based on the shape of the bare fiber 702. For example, the bare fiber 702 may be cylindrically shaped, elliptical, or any other shape suitable for propagating light.

The fiber clamp 700 may use any type of configuration, mechanism, or means to open the securing arms 712. For example, the linkage 710 may pivotally connect to the tension bar for opening the securing arms 712 when the locking button 704 is pressed. The linkage 710 may use any number of arms, hinges, levers, and stops to pivotally open the securing arms 712. In another embodiment, the fiber clamp 700 may use a circular or cylindrical clamp that expands and retracts to secure the bare fiber 702.

Figure 8:
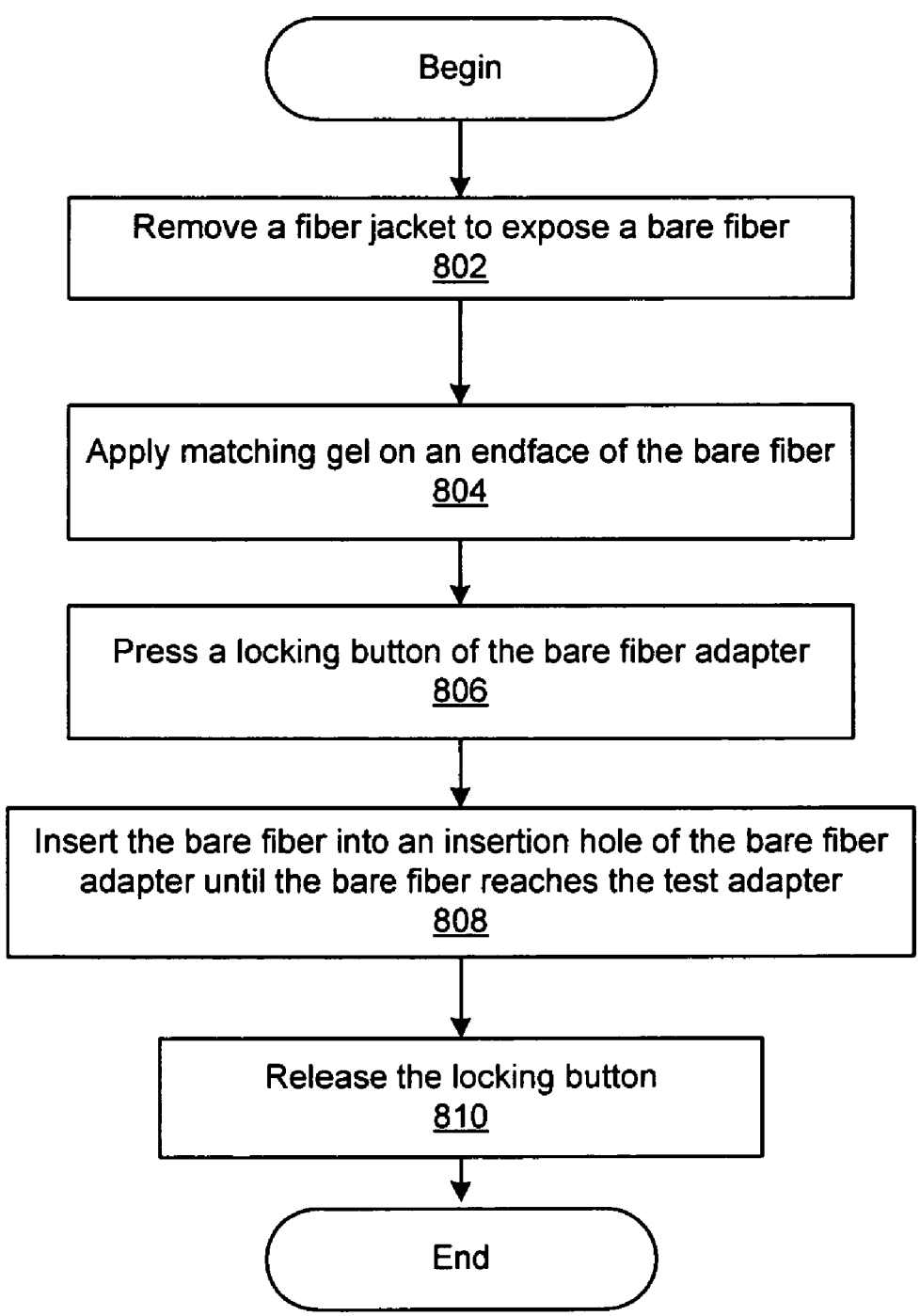
FIG. 8 is a flowchart of a process for using a bare fiber adapter in accordance with an illustrative embodiment.

FIG. 8 is a flowchart of a process for using a bare fiber adapter in accordance with an illustrative embodiment. The process of FIG. 8 may be implemented by a user utilizing a bare fiber adapter. The process may begin by removing a fiber jacket to expose a bare fiber (step 802). The fiber jacket may include the shielding, clotting, buffer, installation, armor, or other protective materials surrounding the bare fiber. In addition, during step 802, the configuration or size of the bare fiber adapter may specify a minimum and/or a maximum amount of bare fiber that may need to be exposed in order to properly test the fiber optic. In one embodiment, the user may be required to expose 15 to 20 millimeters of bare fiber for proper testing. In one embodiment, the fiber jacket may be removed using a stripper that is integrated into the bare fiber adapter.

Next, the user applies matching gel on an endface of the bare fiber (step 804). The matching gel may be used in step 804 to prevent loss between the endface and the ferrule of the test adapter or connector. The matching gel may have index matching capabilities that prevent reflection or undesirable refraction at the connection between the endface and the ferrule.

Next, the user presses the locking button of the bare fiber adapter (step 806). The locking button may allow the bare fiber to be inserted into an insertion hole of the bare fiber adapter. In particular, the locking button may release a spring clamp, elastomeric clamp, or hydraulic clamp employed by the bare fiber adapter to cushion or otherwise secure the bare fiber within the bare fiber adapter.

Next, the user inserts the bare fiber into an insertion hole of the bare fiber adapter until the bare fiber reaches the test adapter (step 808). The bare fiber may be guided within the bare fiber adapter by a channel until the endface of the bare fiber abuts with a test fiber with a ferrule of the test adapter providing a junction between the bare fiber and the test fiber.

Next, the user releases the locking button (step 810). Once the locking button is released in step 810, the spring-loaded clamp secures the bare fiber and, as a result, testing may occur without further securing actions being required by the user. The bare fiber adapter may be mounted to a test stand or securely fastened to a truck or other element of the user's or technician's equipment that prevents the bare fiber adapter from moving during testing. For example, a magnetic fastener may be used to attach the bare fiber adapter to a secure location during testing. At that point, the user may perform any number of tests on the fiber optic to determine characteristics, performance, and/or troubleshoot the fiber optics as needed.

The previous detailed description is of a small number of embodiments for implementing the invention and is not intended to be limiting in scope. The following claims set forth a number of the embodiments of the invention disclosed with greater particularity.

What is claimed:

1. A method for testing a bare fiber optic, the method comprising:
   engaging an actuator of an adapter in response to a user selecting a locking button;
   receiving the bare fiber optic in an insertion hole of the adapter for ensuring contact between the bare fiber optic and a test adapter in response to the actuator being engaged;
   releasing the actuator in order to secure the bare fiber optic in a fiber clamp for testing in response to the user releasing the locking button, the actuator being connected to the locking button by a biased linkage;
   testing the bare fiber optic through the test adapter in contact with the adapter, the fiber clamp securing an endface of the bare fiber optic within a ferrule of the test adapter; and
   receiving air or water through cleaning ports in communication with the fiber channel and the test adapter for cleaning the adapter for reuse.

2. The method according to claim 1, removing protective materials surrounding the bare fiber optic to expose a minimum length of the bare fiber optic utilizing a fiber stripper integrated with the adapter.

3. The method according to claim 1, further comprising:
   magnetically securing the adapter using a magnetic fastener for testing the bare fiber optic, the adapter including a rectangularly shaped metal case for protecting internal components of the adapter from damage.

4. The method according to claim 2, further comprising:
   precisely cleaving the bare fiber optic to generate the endface of the bare fiber optic that is perpendicularly configured to enable testing without significant loss; and
   placing a matching agent on the bare fiber optic to better enhance a connection between the bare fiber optic and the test adapter.

5. The method according to claim 2, wherein the releasing further comprises:
securing the minimum length of the bare fiber optic with the fiber clamp, wherein the fiber clamp corresponds to a shape of the bare fiber optic for securing the bare fiber optic, and wherein the actuator closes the fiber clamp to secure the bare fiber optic as released.

6. The method according to claim 1, wherein in a default position when the locking button is not selected by the user the biased linkage blocks the bare fiber optic from being fully inserted into the insertion hole.

7. The method according to claim 1, wherein the test adapter is a test jumper connected to the adapter by a test port, wherein the test port is a hybrid test port operable to receive test adapters selected from the group FC, SC, ST, LC, or MTRJ adapter.

8. The method according to claim 1, wherein the test adapter is permanently integrated with the adapter.

9. The method according to claim 7, wherein the test port includes a clip for inserting and releasing the test adapter from the test port, wherein a cover of the adapter is removable for cleaning internal components of the adapter, wherein the insertion hole is funnel shaped for facilitating the receiving of the bare fiber optic.

10. The method according to claim 5, wherein the actuator is connected to the locking button that allows the bare fiber optic to be inserted or released as the locking button is engaged and secured as the locking button is disengaged, the locking button being connected to a tension bar, the tension bar being biased toward a closed position by a tension spring, and the tension bar opening and closing the fiber clamp utilizing a linkage, the tension bar, tension spring, and linkage comprising the biased linkage.

11. A bare fiber adapter, comprising:
a port for receiving a test adapter;
a clip connected to the port for inserting and releasing the test adapter from the port;
an insertion hole for receiving a bare fiber optic into a fiber channel; and
an actuator configured to release a fiber clamp, wherein as the actuator is engaged, permits the bare fiber optic to be inserted or removed from the insertion hole, and wherein when the actuator is disengaged, the bare fiber optic secures the bare fiber optic for testing, wherein the fiber clamp is spring-loaded by a tension spring, the fiber clamp being connected to a locking button activating the actuator by a linkage pivotally connected to a tension bar, the tension bar being biased by the tension spring, the fiber clamp cushioning the bare fiber optic during testing so that a user does not have to hold or secure a fiber optic, the bare fiber adapter, or the test adapter.

12. The bare fiber adapter according to claim 11, further comprising:
a rectangular case protecting components of the bare fiber adapter from foot traffic; and
a magnetic fastener configured to magnetically securing the bare fiber adapter during testing.

13. The bare fiber adapter according to claim 11, wherein the insertion hole is funnel shaped for receiving the bare fiber optic, wherein a minimum length of the bare fiber optic is exposed in order to test the bare fiber optic, wherein the fiber clamp secures the minimum length of the bare fiber optic, wherein the test port secures the test adapter for testing, and wherein the fiber channel aligns an endface of the bare fiber optic with a test fiber within a ferrule of the test adapter.

14. The bare fiber adapter according to claim 11, further comprising:
cleaning ports in communication with the fiber channel and the test adapter for cleaning the bare fiber adapter with air or water for reuse.

15. The bare fiber adapter according to claim 11, further comprising: a lever in communication with the fiber channel operable to remove a broken fiber from the fiber channel in response to user activation of the lever.

16. The bare fiber adapter according to claim 11, wherein the test adapter is integrated with the adapter.

17. The bare fiber adapter according to claim 11, further comprising:
a fiber cleaver configured to precisely cleave the bare fiber optic to create an endface that is suitable for testing; and
a fiber stripper configured to remove protective coverings surrounding the bare fiber optic in order to insert the bare fiber optic into the bare fiber adapter for testing.

18. A bare fiber adapter, comprising:
a test port for receiving a hybrid test adapter configured to interface with a test set, the test port including a clip;
an insertion hole configured to receive a bare fiber optic into a fiber channel that guides the bare fiber optic to an interface of the hybrid test adapter, the insertion hole being funnel shaped for guiding the bare fiber optic into the fiber channel;
a locking button linked to a fiber clamp by a biased linkage that as pressed allows the bare fiber optic to be inserted into the insertion hole, wherein as the locking button is released, the fiber clamp secures the bare fiber optic for testing; and
a magnetic fastener for magnetically securing the bare fiber adapter during testing.

19. The bare fiber adapter according to claim 18, wherein the biased linkage further comprises:
a tension spring connected to the locking button and a tension bar for biasing the fiber clamp to a closed position when the locking button is not pressed; and
a linkage pivotally connected to the tension bar for opening and closing the fiber clamp in response a user pressing the locking button.

20. The bare fiber adapter according to claim 19, further comprising:
a cleaning port in communication with the fiber channel and test port for fluidly cleaning a fiber or matching gel from an adapter;
a changeable case for configuring the adapter for an environment in which the adapter is utilized;
a fiber cleaver configured to precisely cleave the bare fiber optic to create an endface that is suitable for testing; and
a fiber stripper configured to remove protective coverings surrounding the bare fiber optic in order to insert the bare fiber optic into the bare fiber adapter for testing.

* * * * *